United States Patent [19]

Macovski

[11] 4,002,914
[45] Jan. 11, 1977

[54] TRANSPARENCY CONTRAST ENHANCEMENT SYSTEM

[75] Inventor: Albert Macovski, Palo Alto, Calif.

[73] Assignee: Maxim Diagnostic Imaging, a California Limited Partnership, Palo Alto, Calif.

[22] Filed: Feb. 27, 1976

[21] Appl. No.: 661,959

Related U.S. Application Data

[63] Continuation-in-part of Ser. No. 538,017, Jan. 2, 1975, abandoned.

[52] U.S. Cl. .......................... 250/461 R; 350/158; 350/159
[51] Int. Cl.² .................. G01N 21/38; G02B 1/24; G02B 5/30; G02B 27/28
[58] Field of Search ........... 350/156, 158, 159, 15; 250/329, 461 R; 353/122

[56] References Cited

UNITED STATES PATENTS

| 2,152,353 | 3/1939 | Lewin | 250/461 |
| 2,168,225 | 8/1939 | Lewin | 250/461 |
| 2,192,295 | 3/1940 | Berek | 350/15 |
| 3,062,087 | 11/1962 | Zandman et al. | 350/157 |
| 3,419,984 | 1/1969 | Sakamoto | 40/79 |
| 3,567,309 | 3/1971 | Jasgur | 350/156 |
| 3,682,531 | 8/1972 | Jeffers | 350/156 |

Primary Examiner—Steven L. Stephan

[57] ABSTRACT

A transparency is illuminated from the viewing side with a light converter backing placed against the opposite side. The light reflected from the viewing surface of the transparency is rendered invisible to the viewer. A partially reflecting mirror is placed against the viewing side in regions of particularly low contrast to provide additional enhancement. Back illumination is used to provide adequate brightness in relatively dark areas.

22 Claims, 6 Drawing Figures

TRANSPARENCY CONTRAST ENHANCEMENT SYSTEM

CROSS-REFERENCES TO RELATED APPLICATIONS

This is a Continuation-in-Part application which includes a substantial portion of application Ser. No. 538,017 filed Jan. 2, 1975, now abandoned, by the same inventor and having the same title.

BACKGROUND OF THE INVENTION

1. Field of the Invention

This invention relates to transparency viewing systems. In a primary application the invention relates to multiple-pass illumination of radiographic transparencies which are difficult to interpret because of inadequate contrast using single-pass illumination.

2. Description of the Prior Art

Photographic transparencies often have over or under-exposed regions whose detail contrast is severely reduced. This is particularly true of radiographic transparencies which are under-exposed in relatively dense regions of the body. Thus relatively subtle lesions, such as small tumors, cannot be visualized because of the inadequate contrast.

One of the earliest examples of contrast enhancement is U.S. Pat. No. 2,152,353 issued to Hans Lewin on Mar. 28, 1939 entitled, "Roentgen Photography." In this patent a doubling of the contrast is achieved by illuminating the radiographic transparency with ultraviolet light and using a phosphorescent backing. This effectively doubles the contrast since the film density attenuates both the ultraviolet on the first pass and the visible fluorescent light on the second pass. Although this system improves the contrast of low-density under-exposed regions, it significantly reduces the visibility of medium and high density regions. In these cases the doubling of the density makes these regions essentially invisible. Thus an additional conventional viewing device with back-illumination only would be required. The radiologist would have to move the film from one viewing device to the other to view it over its entire range. Another difficulty with this system is that the maximum contrast enhancement available in the low density regions is a factor of two which, in many cases, may not be adequate.

A system for improving the situation entitled, "Enhancement of Observed Contrast in Radiography By Use of Multi-Pass Illumination," by R. H. Wight was described in the *Proceedings of the Society of Photo-Optical Instrument Engineers*, Vol. 26, 1971, on pages 59–62. In the system described, a reflective structure was placed against the back or non-viewing side of the transparency which is illuminated from both the front and the back. Thus the front illumination goes through the transparency twice which effectively doubles the optical density. This doubling improves the contrast of subtle regions which are difficult to visualize. In addition, the reflecting structure is translucent which allows for back illumination. This back illumination is important for visualizing the regions of high density which are essentially opaque to the double-pass front illumination.

Although this system provides some improvement, it has two important disadvantages or inadequacies. Firstly, the front illumination can be reflected from the front surface or viewing side of the transparency, thus seriously reducing the observed contrast. Secondly, as before, the maximum contrast improvement which can be achieved is represented by a doubling in density. This is very often inadequate in a very lightly exposed region.

SUMMARY OF THE INVENTION

An object of this invention is to provide a transparency viewing system with increased contrast without reducing the visibility of any region.

It is also an object of this invention to provide a contrast-enhancing system which is controllable over a wide range.

It is a further object of this invention to provide a viewing system with front illumination where the light reflected from the surface or viewing side of the transparency is invisible to the viewer.

Briefly, in accordance with the invention a light converter structure is placed behind the transparency. The transparency is illuminated from the viewing side such that the light reflected from the surfaces of the transparency is invisible to the viewer. In relatively transparent regions, a partially reflecting mirror is placed against the viewing side of the transparency to further improve the contrast through multiple passes. In relatively dense regions, the transparency is back-illuminated through the translucent light converter structure.

BRIEF DESCRIPTION OF THE DRAWINGS

For a more complete disclosure of the invention, reference may be made to the following detailed description of several illustrative embodiments thereof which is given in conjunction with the accompanying drawings, of which.

DESCRIPTION OF THE PREFERRED EMBODIMENT

Figure 1:
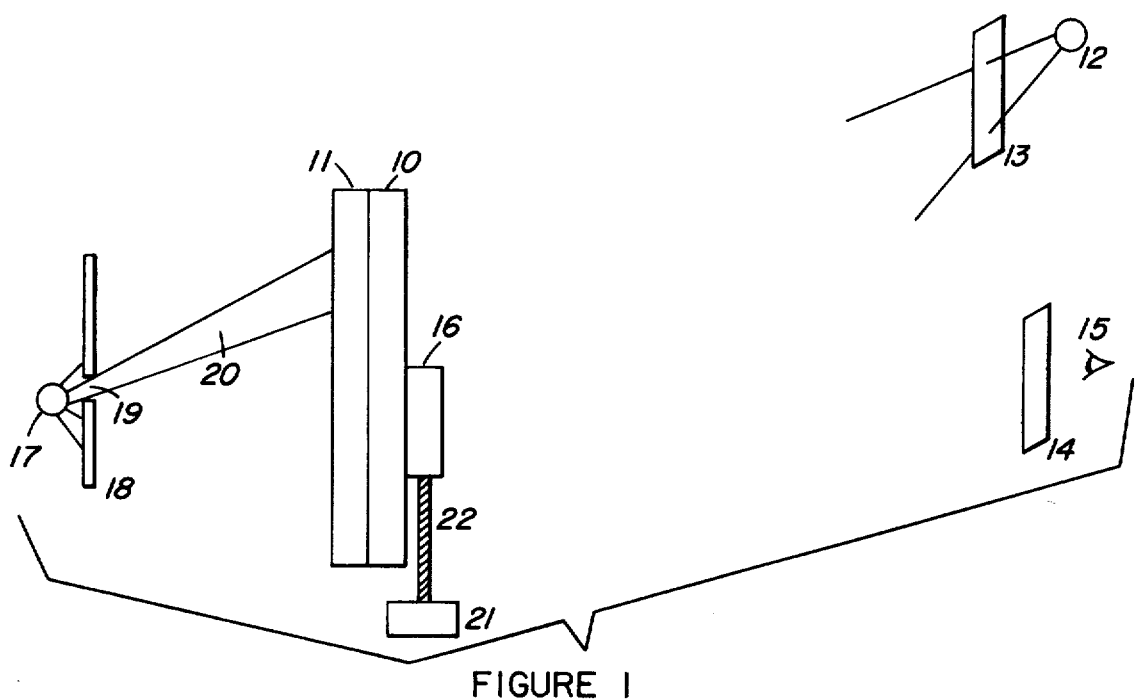
FIG. 1 illustrates an embodiment of the invention using a diffuse light converter structure.

An understanding of the broad aspects of the invention may best be had by reference to FIG. 1 of the drawings. A photographic transparency 10 has regions which require contrast enhancement. This transparency can be a radiograph with regions of relatively low exposure which are difficult to visualize. The radiograph can have regions of very subtle changes in density representing regions of disease such as tumors where the density change is too small to be visualized. Over and above radiography, the transparency can be a photographic tranaparency which was poorly exposed so that an improved version is desired.

Ignoring 13, 14 and 15, the transparency 10 is placed against a diffuse light converting surface 11. A source of front illumination 12 is projected through transparency 10 onto diffuse light converting surface 11. The converted light again passes through transparency 10 and is viewed by viewer 15. Thus, as with the system of R. H. Wight previously referenced, the optical density of each region will be doubled. However, as with the Wight system, the light reflected from the front surface of the transparency will seriously reduce the viewed contrast by adding a bias value to the image. The undesired light can be eliminated by rendering the reflected light from the front surface invisible to viewer 15. In essence this is accomplished by making the initial light coming from source 12 invisible to viewer 15. The light converting surface 11 then acts to convert this light into a form which is visible to viewer 15. One method of accomplishing this is the use of a linear polarizer 13 and analyzer 14 which are of opposite polarization. The linear polarizer, for example a vertical polarizer, only allows vertically polarized light from light source 12 to reach transparency 10. Light reflected from the front surface of transparency 10 will also be vertically polarized and thus not pass through analyzer 14 which is a linear horizontal polarizer. The desired light passing through transparency 10 is randomly polarized when it strikes light converter 11 which in this method is a diffuse reflector which converts some of the vertically polarized light to horizontal polarization. The horizontally polarized component of this reflected light again passes through transparency 10, is passed by analyzer 14 and viewed by viewer 15. The vertically polarized component of this light is not viewed since it is stopped by analyzer 14. Thus a doubling of the density is achieved with the undesired reflected light eliminated from the viewer. Although crossed linear polarizers were used in this example, any orthogonal polarizations such as right circular and left circular can be used.

Another method of accomplishing this same result is for light source 12 to be an ultraviolet source with 13 and 14 not required. Here 11, the light converter, is a phosphorescent material which emits visible light when illuminated by ultraviolet ligh such as the white phosphor on the walls of fluorescent lights. When the ultraviolet light first passes through transparency 10 to form an ultraviolet image on 11. The resultant visible phosphorescent image on 11 again passes through transparency 10 providing the desired doubling of the viewed optical density. The viewer 15 views the visible light which passes through transparency 10. The light reflected from the front surface of transparency 10 is ultraviolet light and thus invisible to viewer 15. This doubling of optical density is of great value in radiographic diagnosis in that many lesions which would not be visualized in the original radiograph would become visible. This property is described in the paper entitled, "A Multiple-Film Technique for Contrast Enhancement and-or Reduction of Patent Exposure" by E. R. Miller in Radiology, Vol. 110, pages 361–364, February 1974. In this study, a duplicate radiograph is made which is registered with the original so as to double the optical density. This method is relatively awkward and time-consuming but it does serve to indicate the value of the process. As indicated the contrast enhancement can be used directly or traded for reduced x-ray radiation by reducing the exposure.

In the methods described thusfar the optical densities of each region are doubled. In many cases, such as lightly exposed regions of radiographs, greater contrast enhancement is desired. This may be achieved by adding partially reflective mirror 16 on the viewing side of the transparency. As shown, this mirror can be placed over the entire transparency 10 or over a portion which needs additional contrast enhancement. This partially reflecting mirror reflects part of the image light passing through transparency 10 back to diffuse light converter 11 where it is again reflected. Thus a portion of the light in the viewed image has gone through a number of passes through transparency 10 and has experienced further contrast enhancement. The greater the reflectivity of the partially reflective mirror 16, the greater the contrast enhancement. An analysis follows subsequently in this application. Illustrated in FIG. 1 is one means of translating mirror 16 to the desired region of interest using lead screw 22 and motor 21. Many other methods can be used.

The use of mirror 16 can cause a partial loss of resolution in addition to the increase in contrast. The light reflected from the diffuse light converter 11 has an angular spread and will continue to spread somewhat as a result of the successive reflections from mirror 16. This resolution loss will be minimal since the transparency 10 is normally quite thin, resulting in relatively small lateral spreading. In addition the successive reflections are each of reduced amplitude so that they contribute diminishing amounts to the resultant intensity and corresponding spreading. In any event this phenomenon will result in somewhat increased contrast for larger scale structures than for fine detail in the image. In radiography, however, it is important to find the subtle low-contrast lesions which are usually greater than a centimeter in size and thus rlatively unaffected by small losses in detail resolution.

One difficulty with the use of this partially reflective mirror 16, especially with relatively high reflectivity, is the large light loss initially experienced. When light from 12 hits this mirror a large portion is reflected, thus making inefficient use of light source 12. If the ultraviolet version previously described is used, then partially reflecting mirror 16 can be a dichroic mirror which transmits in the ultraviolet region and exhibits its partial reflectivity in the visible region. Thus the loss of light is eliminated since the ultraviolet light from source 12 is transmitted through mirror 16 to transparency 10 without attenuation. Dichroic mirrors of this type have often been described in the literature and are widely available from organizations such as Optical Coating Laboratories Inc. in Santa Rosa, Cal.

Optically dense regions can be rendered essentially opaque by the techniques thusfar described. For example dark regions having densities of two to three would become densities of four to six in the double-pass mode and even greater when using the additional partially reflective mirror 16. To render these areas visible, back light source 17 is used. If light converter 11 is made translucent, as is the case with fluorescent screens, the light beam 20 from light source 17 will pass through converter 11 and back illuminate transparency 10 so that it is observed by viewer 15. If desired, the entire transparency can be illuminated in this way. In many cases, however, it will be desired to illuminate a portion of the transparency such as in the case of a radiologist viewing a heavily exposed region of a radiograph. As illustrated in FIG. 1, a mask 18 containing aperture 19 is used to attenuate portions of the light emitted by back light source 17 to form the back illumination beam 20. By translating mask 18, light beam 20 can be made to fall on any desired portion of transparency 10. In addition, mask 18 can have a controllable opening 19 to vary the size of the back-illuminated region. This opening 19 can be a conventional camera iris which has a controllable circular opening. Without mirror 16 is the viewed optical density due to light source 17 alone will be the inherent optical density of transparency 10. The intensities of light sources 12 and 17, along with various partially reflective mirrors 16, can be varied so as to achieve the desired result in any area of interest on transparency 10.

As indicated in the description of the prior art, the system described in the Lewin patent using ultraviolet illumination would obscure medium and high density regions. If the phosphor material is made translucent, as described above, the light from the back illuminator will penetrate the phosphor and provide single-pass illumination for the dense regions. An alternate approach in this embodiment, is to use an ultraviolet source as the source of back illumination 17. The resultant fluorescent light from light converter 11 will efficiently provide the desired single-pass illumination.

Figure 1A:
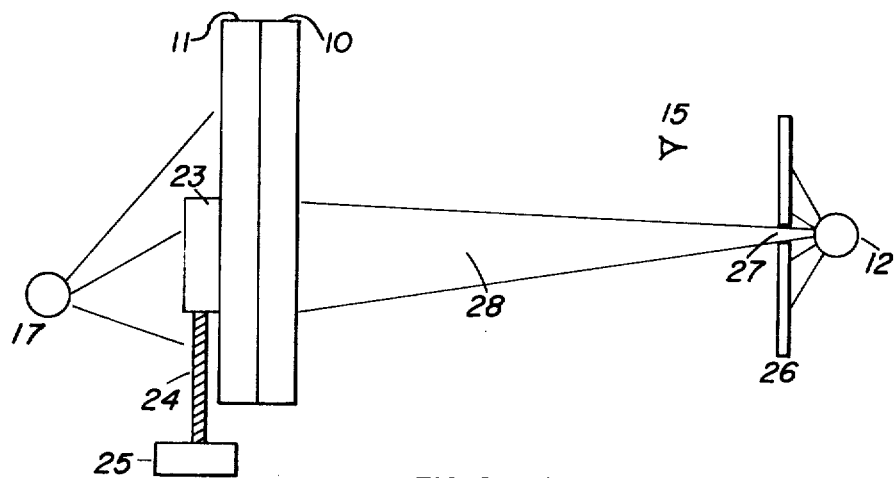
FIG. 1A illustrates an embodiment of the invention where contrast enhancement is selectively applied to a region of the transparency.

If back illumination is used over the entire image field, the contrast enhancement of the low-density underexposed regions will be diminished. To achieve maximum contrast in these areas the back illumination source must be obscured so that these regions achieve only front illumination. This can be accomplished as illustrated in FIG. 1A. A translatable opaque member 23, such as a section of cardboard, is moved to the low density underexposed regions to obscure the light from the back illuminator 17. This translatable opaque member can be translated, for example, by lead screw 24 driven by motor 25. The entire transparency 10 can be illuminated by front light source 12 since the primary effect of this source will be the contrast enhancement of low density areas, in particular the area blocked by opaque member 23. This front illumination, however, will supply a degree of contrast enhancement to denser areas where it is undesired. To avoid this the front light source 12 can be directed solely at the area blocked by the opaque member 23. This can be accomplished by obscuring the front light source with a movable mask 26 having an aperture 27 which directs the beam to the desired low-density region. In the ultraviolet embodiment light source 12 is a source of invisible ultraviolet light and light converter 11 is a phosphorescent screen. In the embodiment using orthogonal polarizations, appropriate polarizing filters are placed in front of light source 12 and viewer 15 such as 13 and 14 shown in FIG. 1. In this embodiment light converter 11 is a diffuse reflector.

Figure 1B:
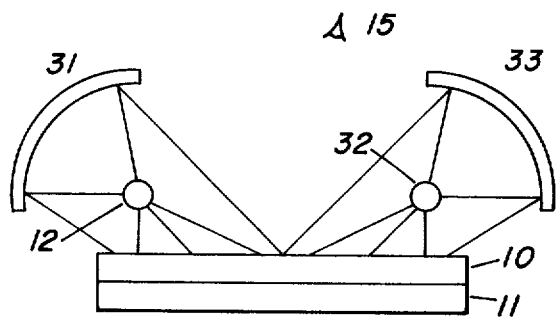
FIG. 1B illustrates an alternate embodiment for providing front illumination.

In the embodiments illustrated in FIGS. 1 and 1A, the viewer was either in front of or alongside the front illumination source. This could cause difficulties when the radiologist moves his head closer to transparency 10 in that he could obscure some of the light from front light source 12. One way of avoiding this problem is the use of a number of front light sources in different positions. A configuration which avoids this problem is illustrated in FIG. 1B. As shown, the front illumination comes from the sides of the transparency 10. Front light sources 12 and 32 can be long cylindrical tubes whose cross section is shown in FIG. 1B. Opaque reflectors 31 and 33 serve the dual role of efficiently coupling the light to the transparency 10, and preventing it from escaping to other regions. Although two such structures are shown, four could be used along the four sides of transparency 10. Each would include a long bulb with an associated long reflector. The four would also create a shadow box effect which would help to prevent outside light from reaching the transparency 11. In the ultraviolet embodiment 12 and 32 would be ultraviolet bulbs with 11 a phosphorescent screen. In the polarization embodiment polarizing filters, such as 13 in FIG. 1, would be placed between sources 12 and 32 and the transparency 12. An orthogonal polarizer would be placed in front of viewer 15, such as 14 in FIG. 1, and the light converter 11 would be a diffuser.

For a more detailed analysis of the entire system let $\pi(x,y)$ be the intensity transmission of transparency 10 and $D(x,y)$ be its optical density as defined by the relationship $$D(x,y) = -\log_{10}\pi(x,y).$$

In the embodiment without back illuminator 17 or partially reflective mirror 16 the viewed image has an intensity proportional to $\pi^2$ and an effective optical density of 2D. Thus the optical density is doubled and all density changes $\Delta D$ also double. The local density change compared to the background, $\Delta D$, is a useful measure of contrast since, for small values it is proportional to the frictional change in intensity $\Delta I/I$.

Using partially reflecting mirror 16 and adding the results of each successive reflection we obtain $$\frac{I_{out}}{I_{front}} = T^2\tau^2 \sum_{n=0}^{\infty} (R\tau^2)^n$$

where $I_{out}$ is the output light intensity, $I_{front}$ is the intensity of the front illumination, $T$ is the transmission of mirror 16 and $R$ is its reflectivity. This expression can be rewritten in closed form as $$\frac{I_{out}}{I_{front}} = \frac{T^2\tau^2}{1 - R\tau^2}$$

As can be seen from this expression, especially for high values of $R$ corresponding to low values of $T$, a significant contrast amplification can be achieved. The contrast enhancement factor can be directly evaluated by referring to the above ratio as $\tau_{eff}$ where $$\tau_{eff} = \frac{T^2\tau^2}{1 - R\tau^2}$$

The contrast enhancement factor E is given by the ratio of $\Delta\tau_{eff}/\tau_{eff}$ to the original $\Delta\tau/\tau$. This can be analyzed in derivative form as $$E = \frac{\delta\tau_{eff}/\tau_{eff}}{\delta\tau/\tau} = \frac{2}{1 - R\tau^2}$$

As is seen in this equation, the enhancement without a mirror, where $R = 0$, is 2 as is expected by the double pass through the transparency. For values of R close to unity, where the mirror 16 is mostly reflecting, significantly higher contrast enhancements are achieved in the underexposed regions of the transparency where $\tau$ approaches unity.

For values of $\tau$ which are relatively low, in heavily exposed regions of the transparency, the enhancement again approaches 2. However, in many of these regions it may be difficult to get sufficient reflected light through the transparency to adequately view the dark area. In those cases, transmitted back illumination is preferred. In the absence of mirror 16, the ratio of $I_{out}/I_{back}$, where $I_{back}$ is the light transmitted through light converter 11, is simply $\tau$. Thus $\tau_{eff} = \tau$ and $E$, the enhancement factor is equal to unity. The mirror 16 can also be used to obtain enhancement for the back lighted case. In that case $\tau_{eff}$ is given by $$\tau_{eff} = \frac{I_{out}}{I_{back}} = \frac{T\tau}{1-R\tau^2}$$

and the enhancement E is given by $$E = \frac{1 + R\tau}{1 - R\tau^2}$$

As is shown, back illumination is characterized by greater output in high density (low $\tau$) regions and correspondingly reduced enhancement factors. For very low values of $\tau$, E will approach unity.

Optimum results can be obtained using combined front and back illumination in selected areas. This can be analyzed by letting $I_{back} = K\, I_{front}$ so that $\tau_{eff}$ is given by $$\tau_{eff} = \frac{I_{out}}{I_{front}} = \frac{T^2\tau^2 + KT\tau}{1 - R\tau^2}$$

and E is given by $$E = \frac{2\tau T + K(1 + R\tau)}{(\tau T + K)(1 - R\tau^2)}$$

In the case of ultraviolet illumination the analysis is unchanged unless a dichroic mirror is used. Here the front illuminated case changes somewhat since the first transmission T of the ultraviolet light is approximately unity through the dichroic mirror. Thus for front illumination only $$\tau_{eff} = \frac{I_{out}}{I'_{front}} = \frac{T\tau^2}{1 - R\tau^2}$$

where $I'_{front}$ is the visible light generated in the phosphorescent screen 11 in the absence of transparency 10. Since the back illuminated case remains unchanged, the combined $\tau_{eff}$ is given by $$\tau_{eff} = \frac{T\tau^2 + KT\tau}{1 - R\tau^2}$$

The enhancement factors for front illumination alone and for back illumination along remain as before. For the combined case, however, the enhancement is given by $$E = \frac{2\tau + K(1 + R\tau)}{(\tau + K)(1 - R\tau^2)}$$

Figure 2:
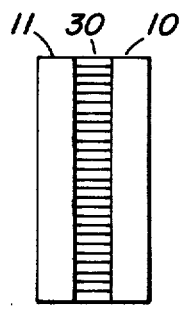
FIG. 2 illustrates an embodiment of the invention using a fiber optic plate against the transparency.

One practical difficulty which can be experienced is that of adequate contact between the transparency 10 and the associated light converter 11. Poor contact will reduce the effective spatial resolution since the reflected images will spread. One method of providing improved contact is the use of a fiber optic plate 30 containing an array of light guides as indicated in FIG. 2. The diffuse material, be it phosphor or white diffusing particles, is deposited on one side of light-guide plate 30. The other side can be smoothly ground. It is placed in intimate contact with transparency 10. The remainder of the system behaves as previously described.

The partially reflecting mirror 16, as indicated in the analysis, has a significant effect on the resultant contrast. It is thus desirable to have a convenient method of varying its degree of transmission and reflection without changing mirrors. One approach is the use of a mirror whose reflectivity and transmission vary with position. These are commercially available items which are usually constructed by varying the thickness of the metalic coating either linearly or angularly along the mirror. Thus by either translating or rotating the mirror along the region being studied, the effective reflectivity and resultant contrast will be controlled.

Figure 3:
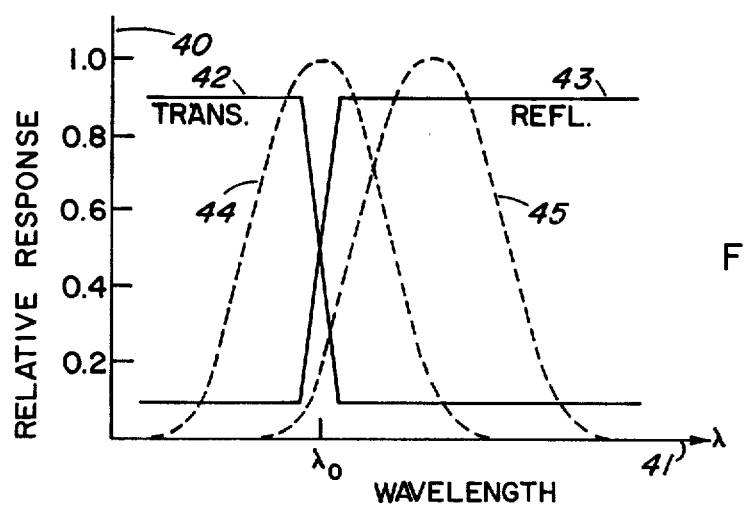
FIG. 3 illustrates a number of spectral responses of a controlled reflectance mirror.

FIG. 3 is a number of reponse curves which illustrates a method of controlling the reflectivity without moving the mirror. The control function is accomplished by varying the spectral content of light source 12 and/or light source 17. This can be accomplished by either placing different spectral filters in front of the light sources, by varying the power applied to the light sources, or by switching various sources on and off. These spectrally controlled light sources are indicated by source spectra 44 and 45 in FIG. 3 which represent two outputs of a spectrally controlled source. The horizontal axis 41 represents the wavelength with the vertical axis 40 the relative response. These sources are used in conjunction with a dichroic mirror whose regions of reflectance 43 and transmission 42 are a function of wavelength as indicated in FIG. 3. As is shown, the source spectra, 44 and 45, have components which overlap the transmission and reflection regions of the dichroic mirror. The average reflectance and transmission of the mirror is governed by what fraction of the source spectra is in the reflective and transmissive portions of the mirror spectra. For example source spectra 44 will provide approximately equal transmission and reflection while source spectra 45 will result in a mirror which is primarily reflective.

The wavelength $\lambda_0$ separates the primarily reflective and transmissive regions. In the cases where orthogonal polarizations are used to suppress the reflected light, $\tau_0$ will be within the visible spectrum. Spectral changes in either the front light source 12 and/or the back light source 17 will provide the previously indicated contrast changes. If light source 12 is ultraviolet, with converter 11 being a phosphor, the spectral control of the mirror will only exist for the back light source 17.

One of the difficulties with the use of partially reflective mirror 16 in FIG. 1 is that ambient light is reflected from the reflecting component of the mirror. Thus, in a well-lit room, the contrast enhancement phenomenon is partially washed out by the reflected ambient light which is visible to viewer 15. The problem can be eliminated by using a mirror 16 which is transmissive or non-reflective in the visible region and partially reflective only in the ultraviolet region. This assumes that the ultraviolet light impinging on light converter 11, which in this embodiment is a phosphorescent screen, will be partially converted to visible light, and partially reflected back through transparency 10. This will usually be the case since most phosphors are white and are thus diffuse reflectors. The light reflected back through transparency 10 is then ultraviolet light which is again partially reflected by mirror 16 back through transparency 10 onto phosphorescent screen 11. In each case the ultraviolet light is partially converted to visible light and partially reflected to provide further contrast enhancement. A complete analysis of this action is given below.

As in the previous analysis $\tau$ is the transmission of the transparency, T the transmission of the mirror in the ultraviolet region and R the reflection coefficient of the mirror. To characterize the phosphor surface we let $v$ be the fractional amount of incident ultraviolet light converted to visible light and $r$ be the amount reflected. Thus, as before, we add successive reflections and obtain $$\frac{I_{out}}{I_{front}} = Tv\tau^2 \sum_{n=0}^{\infty} (\tau^2 rR)^n$$

where $I_{out}$ is the output light intensity and $I_{front}$ is the intensity of the front illumination. In closed form this becomes $$\frac{I_{out}}{I_{front}} = \frac{Tv\tau^2}{1 - \tau^2 rR} = \tau_{eff}$$

where $\tau_{eff}$ is the symbol previously given for this ratio. The contrast enhancement factor E is given by $$E = \frac{2}{1 - \tau^2 rR}$$

which is similar to the previous expression using a mirror except that the product of the mirror reflectivity R and the phosphor reflectivity $r$ determines the factor at each region $\tau$. Significant enhancements can thus be obtained in low density regions where $\tau$ approaches unity.

Figure 3A:
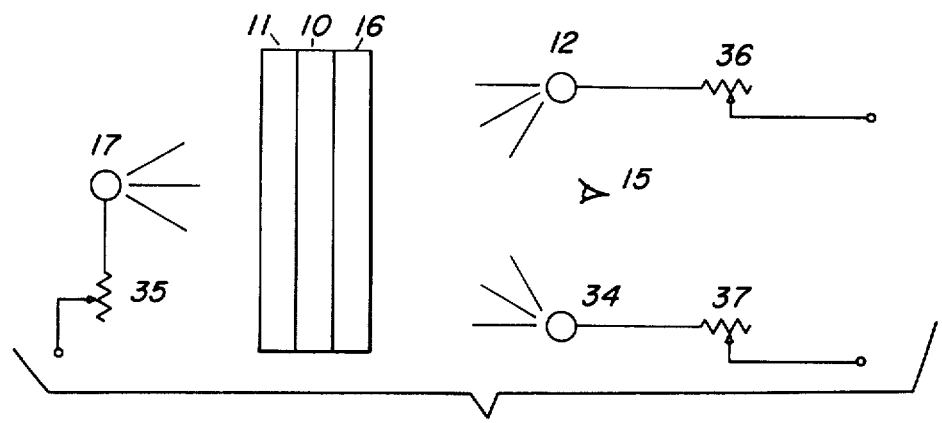
FIG. 3A illustrates an embodiment providing a wide range of control over the contrast.

An extension of this general approach is illustrated in FIG. 3A. Here ultraviolet partially reflecting mirror 16, rather than being movable, is fixed and covers the entire transmissive transparency 10. This mirror is made transmissive (non-reflective) over the entire visible and near ultraviolet regions. For example, it can be transmissive at all wavelengths greater than 350 nanometers, with the visible spectrum beginning at about 450 nanometers. At shorter wavelengths, below 350 nonometers, it is partially reflective. Front light sources 12 and 34 are in the near and far ultraviolet regions respectively. Thus source 12 radiates at wavelengths above 350 nanometers and source 34 radiates at wavelengths below below 350 nanometers, with both providing invisible light which generates visible light in the phosphorescent screen 11. Back light source 17, as before, can either be in the visible region, making use of the translucence of 11, or ultraviolet, making use of the fluorescence of 11. Each of these light sources is subject to controls. These controls, 35, 36, and 37, are shown in FIG. 3A as rheostats controlling the amount of power applied to each source. Alternatively various mechanical shutters or neutral density filters can be used as controls. This embodiment provides for a wide range of viewed contrast. For example, with source 17 on and the other two off, the system becomes a conventional single pass illuminator which is desirable for high density regions.

The visible light emanating from 11 is completely transmitted by mirror 16, so that the mirror is ignored. With source 12 on and the other two off the system becomes a double-pass illuminator doubling the density in all areas, which is desirable for the relatively low density regions. Here again, the mirror 16 is transparent to the light from source 12. With source 34 on and the other two off the system provides increased contrast beyond the doubling of the density, as previously analyzed. At this lower wavelength mirror 16 is partially reflective and thus acts to further enhance the contrast. Controls 35, 36 and 37 and thus be adjusted to provide a continuously adjustable wide range of contrasts to optimize any region of transparency 10. In addition mirror 16 will not reflect any of the ambient light which would otherwise reduce the contrast.

Although in FIG. 1 the viewer 15 is indicated as the human eye, it can also represent any image reproducing system such as a photographic or television camera. In many cases it is desired to reproduce the enhanced contrast image in photographic form. This is accomplished by using a photographic camera for viewer 15 where the camera is focused on transparency 10.

What is claimed is:

1. Apparatus for viewing a transparency having a viewing side and a non-viewing side comprising:
a front illuminator for illuminating the transparency from the viewing side with a first illuminant which is substantially invisible to the viewer;
a converter structure positioned adjacent to the non-viewing side of the transparency which converts the first illuminant after it passes through the transparency to a second illuminant which is visible to the viewer; and
means for back illuminating the converter structure so that said back illumination illuminates the non-viewing side of the transparency with visible light.

2. Apparatus as recited in claim 1 wherein the first illuminant is polarized light, the second illuminant is polarized light which is polarized orthogonal to that of the first illuminant and the converter structure is a reflecting diffuser which converts polarized light to depolarized light.

3. Apparatus as recited in claim 2 wherein the front illuminator includes a visible light source and a first polarizing filter and a second polarizing filter polarized orthogonally to the first polarizing filter is positioned between the transparency and the viewer.

4. Apparatus as recited in claim 1 wherein the first illuminant is ultraviolet light, the converter structure is a phosphorescent screen and the second illuminant is the visible light emitted by the phosphorescent screen.

5. Apparatus as recited in claim 1 wherein a partially reflecting mirror is positioned adjacent to the viewing side of the transparency.

6. Apparatus as recited in claim 5 wherein the partially reflecting mirror is smaller than the transparency and including means for translating the mirror to any region of the transparency.

7. Apparatus as recited in claim 5 wherein the partially reflecting mirror is transparent to the first illuminant and is partially reflecting to the second illuminant.

8. Apparatus as recited in claim 7 wherein the partially reflecting mirror is a dichroic mirror which is transmissive to ultrviolet light and is partially reflective to visible light.

9. Apparatus as recited in claim 5 including means for controlling the reflectance of the partially reflecting mirror.

10. Apparatus as recited in claim 9 wherein the partially reflecting mirror has a reflectivity which varies over different regions of the mirror and including means for moving different region of the mirror to an area on the transparency whereby the contrast in that area is controlled.

11. Apparatus as recited in claim 9 wherein the partially reflective mirror is a dichroic mirror having a first spectral region over which the mirror is transparent and a second region over which the mirror is reflective and wherein the front illuminator includes means for varying its output spectrum so that controllable amounts are apportioned between the first and second spectral regions whereby the average reflectance over the entire spectral region is controlled.

12. Apparatus as recited in claim 5 wherein the first illuminant is ultraviolet light, the converter structure is a phosphorescent screen which partially reflects ultraviolet light, and the partially reflecting mirror is transparent to the second illuminant in the visible spectrum and partially reflective in the ultraviolet spectrum whereby contrast enhancement is achieved through multiple reflections of the ultraviolet image.

13. Apparatus as recited in claim 5 including a third illuminant in the long-wave region of the ultraviolet spectrum wherein the first illuminant is in the short-wave region of the ultraviolet spectrum and the converter structure is a phosphorescent screen which emits the second illuminant, visible light, in response to both the first and third illuminants and is partially reflective to ultraviolet light, and the partially reflective mirror is transparent to the second and third illuminants and partially reflective to the first illuminant whereby contrast enhancement is achieved through multiple reflections of the ultraviolet image.

14. Apparatus as recited in claim 13 including means for controlling the intensities of the first illuminant, the third illuminant and the means for back illuminating the converter structure whereby a wide range of controlled contrast enhancement is achieved.

15. Apparatus as recited in claim 1 wherein the means for back illuminating the converter structure is a source of visible light and the converter structure is translucent.

16. Apparatus as recited in claim 4 wherein the means for back illuminating the converter structure is a source of ultraviolet light whereby the resultant visible light emitted by the phosphorescent screen back illuminates the transparency.

17. Apparatus as recited in claim 1 wherein the means for back illuminating the converter structure includes means for controlling which portion of the transparency is illuminated with visible light.

18. Apparatus as recited in claim 17 including means for varying the size of the region illuminated by the back illuminator.

19. Apparatus as recited in claim 17 wherein the means for controlling which portion of the transparency is illuminated with visible light is a translatable opaque member placed between a source of back illumination and the converter structure.

20. Apparatus as recited in claim 1 including means for controlling which portion of the transparency is illuminated by the front illuminator.

21. Apparatus as recited in claim 1 wherein the front illuminator consists of a plurality of cylindrical sources positioned along the sides of the transparency in a plane between the viewer and the transparency with each cylindrical source having an opaque reflector which reflects the first illuminant towards the transparency.

22. Apparatus as recited in claim 1 wherein the converter structure includes a planar array of light guides in contact with the transparency whose optical axis is normal to the transparency.

* * * * *